Oct. 17, 1961 W. B. JASPERT, JR 3,004,366
PLANT SUPPORTS
Filed June 5, 1959
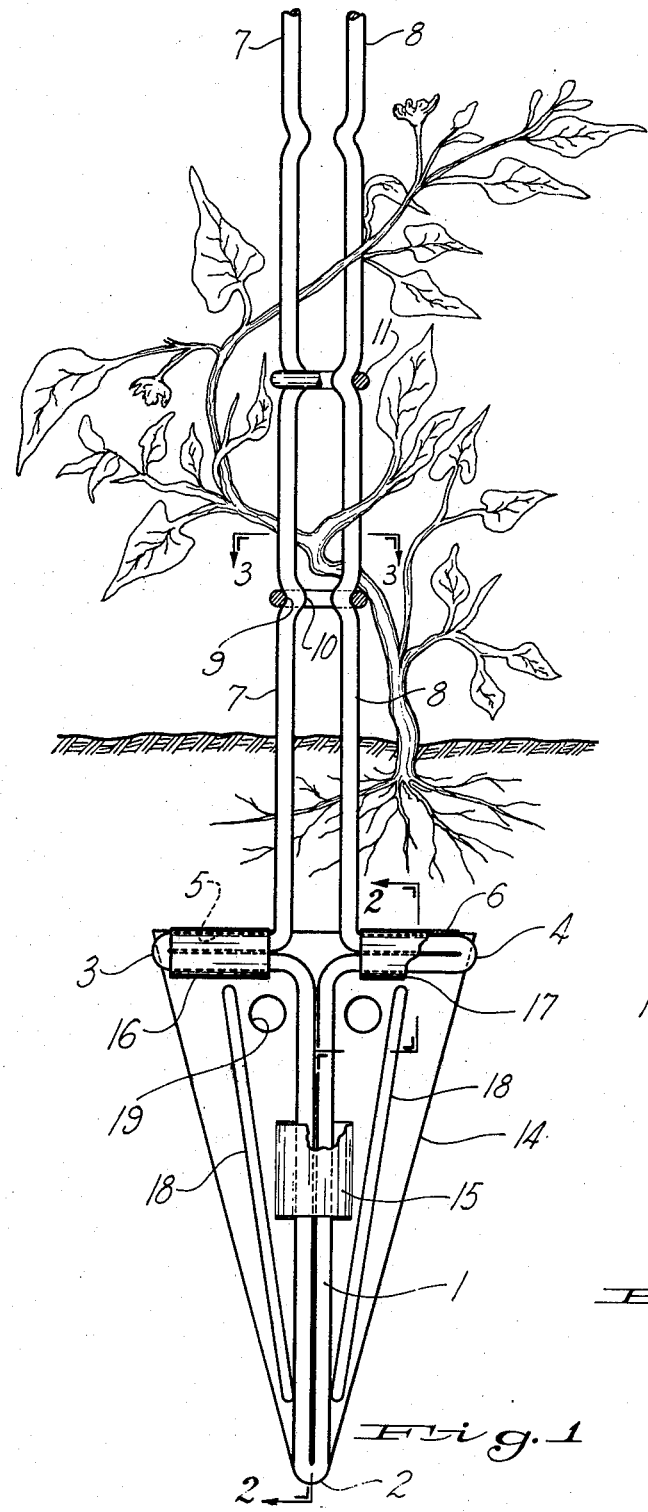
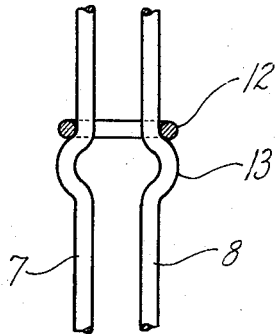
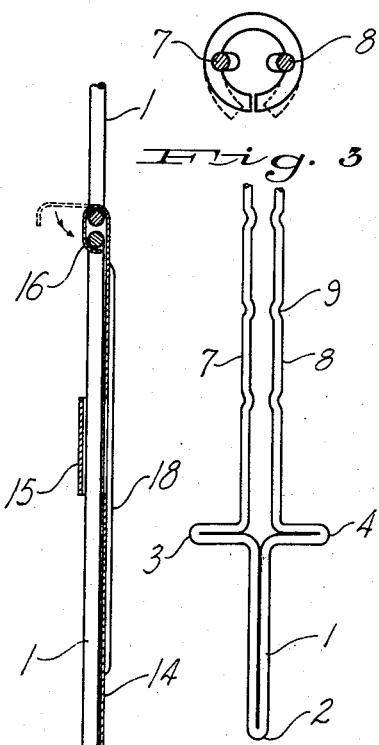
INVENTOR.
William B. Jaspert Jr.
BY William B. Jaspert
Attorney.

3,004,366
PLANT SUPPORTS
William B. Jaspert, Jr., 5050 Frich St., Pittsburgh, Pa.
Filed June 5, 1959, Ser. No. 818,286
2 Claims. (Cl. 47—47)

This invention relates to new and useful improvements in plant supports and it is among the objects thereof to provide a plant support of lightweight, durable material which shall be shaped to hold plants or vines and support them in an upright position without the need for any ties or the like.

It is a further object of the invention to provide plant supports in the form of a cross made from a single piece of flexible material such as metal, wire or rod or thin strips of other cross-sectional shape which may be joined at one end by doubling to form an anchor piece and folded upon itself to form flanges or horizontal cross members from which the plant supporting members or uprights extend upward in parallel strands to form a yielding bifurated plant gripping element.

It is a further object of the invention to provide a plant support of the above-designated character which shall be made of such lightweight flexible material that it will permit bending of the upright plant support without causing displacement of the piece set in the ground.

A further object of the invention is the provision of parallel supporting members shaped to effect proper spacing and to receive fastening means to constitute them a structural member, if desired.

It is still a further object of this invention to provide an anchor plate which is interlocked with the short upright of the cross shaped plant support.

These and other objects of the invention will become more apparent from a consideration of the accompanying drawing constituting a part hereof in which like reference characters designate like parts and in which:

FIGURE 1 is a front elevational view diagrammatically illustrating a plant support embodying the principles of this invention;

FIGURE 2, a cross-sectional view, partially in elevation, taken along the line 2—2 of FIGURE 1;

FIGURE 3, a transverse section taken along the line 3—3 of FIGURE 1;

FIGURE 4, a modified form of plant support with clamping means therefor; and

FIGURE 5, a front elevational view of the support shown in FIGURE 1 with the anchor plate removed.

In the drawing the numeral 1 designates a metallic rod folded upon itself to form a tip or point 2 and extending upward flaring in opposite directions to form horizontal cross members. The rod is folded upon itself at 3 and 4 to form the cross members 5 and 6 and the free ends of the rod are bent upward to form parallel strands 7 and 8, which may be indented as shown at 9. The indented portions form projections 10 which may abut to fix the minimum space between the parallel strands 7 and 8. A ring 11 may be provided to slip down over the parallel strands or uprights 7 and 8 when they are held together and when released the rings will fit into the indents 9 wherein they are held by the spring action to constitute the uprights a structural member.

In the modification shown in FIGURE 4, rings 12 are employed to hold the uprights 7 and 8 from separating, but instead of the indents 9 of FIGURE 1, the uprights are bulged outwardly, as shown at 13, to form shoulders on which the rings 12 rest.

To provide ease of insertion of the plant supports in the ground and to prevent the otherwise narrow tip from cutting through the soil and cause the support to bend, an anchor plate 14 is attached to the plant support as follows:

As shown in FIGURE 2, the sheet metal member 14 is provided with an upstruck portion 15 through which the folded over end of the metal rod 1 extends and the upper end of the member 14 is provided with ears 16 and 17 which are folded over in the manner shown in FIGURE 2, to interlock the member 14 with the tip and cross members 5 and 6 of the plant support.

The spear-head shaped anchor may be driven into the ground by employing a piece of heavy-duty pipe of a size to allow the uprights 7 and 8 to pass through the center thereof and by striking the top of the cross members 5 and 6 with the end of the pipe, the tip will readily sink into the ground. The indents 9 or bulges 13 extend at spaced intervals along the uprights of the plant support which may be 4, 6, or 8 feet long, depending on its intended use. For example, it may be employed for supporting tomato plants, as shown in FIGURE 1. The plant is entwined by passing between the parallel uprights back and forth, as shown, thereby interlocking itself with the uprights. The spacing rings 11 may be used at intervals and may function to support the plant, but may be omitted where the plant is not passing between the strands.

It is readily seen from the foregoing description of the invention, that a plant support may be made of very thin steel or aluminum wire, the steel wire being preferred as it can be made thinner and for a springier action. Wire as thin as 1/8 of an inch or less can afford sufficient strength for supporting the plant and by the use of the holding rings 11, the double strand of wire acquires a structural shape which is of many times greater strength than the wires themselves. At the same time, the uprights have sufficient flexibility that if they are pushed, they will yield without uprooting the anchor 14.

The plant support may also be used as beanpoles by grouping 3 or 4 around a circle and slipping a ring over the top to hold the extended ends together. It would be ideal for this use because the bean vines would pass between the uprights and secure themselves against falling off. As shown in FIGURE 1, the anchor portion 14 may be provided with reinforcing ribs 18 to stiffen the same and also with holes 19 which can be engaged with hooks to pull the supports out of the ground at the end of the growing season.

Although one embodiment of the invention has been herein illustrated and described, it will be evident to those skilled in the art that various modifications may be made in the details of construction without departing from the principles herein set forth.

I claim:
1. A plant support in the shape of an inverted cross with the short upright adapted for seating in the ground, said support consisting of a one-piece metal rod double at the end of the short upright by folding upon itself into contacting relation and bent at right angles in opposite directions to form horizontal cross pieces, said rod ends being folded upon themselves in superposed contacting relation at the end of the cross pieces to double the cross pieces and said rod ends being again bent at right angles to form long parallel uprights extending in vertical alignment with said short upright and having a space therebetween, said parallel uprights having loose ends and having deformities at spaced intervals for receiving gripping members to fix the uprights against separation and gripping members in the shape of links adapted to straddle the long uprights and seat on said deformities.

2. A plant support as set forth in claim 1 having an anchor plate consisting of a V-shaped sheet metal member having its point co-extensive with the end of the short upright and having its wide portion folded over the horizontal cross pieces of the support, said sheet metal member having a pierced upstruck portion in interlocking engagement with the body of the short upright.

References Cited in the file of this patent

UNITED STATES PATENTS

| | | |
|---|---|---|
| 538,878 | Mills | May 7, 1895 |
| 936,402 | Beasley | Oct. 12, 1909 |

FOREIGN PATENTS

| | | |
|---|---|---|
| 297,923 | Great Britain | Oct. 11, 1928 |
| 536,287 | Great Britain | May 9, 1941 |
| 63,283 | Switzerland | Mar. 5, 1913 |